United States Patent
Dailey et al.

(10) Patent No.: US 7,543,845 B2
(45) Date of Patent: Jun. 9, 2009

(54) SELF-CLOSING AIRBAG DOOR ASSEMBLY

(75) Inventors: Daniel Phillip Dailey, West Bloomfield, MI (US); Matthew Thomas Kemp, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 381 days.

(21) Appl. No.: 11/326,146

(22) Filed: Jan. 4, 2006

(65) Prior Publication Data

US 2007/0152429 A1 Jul. 5, 2007

(51) Int. Cl.
B60R 21/20 (2006.01)
(52) U.S. Cl. .................................... 280/728.3
(58) Field of Classification Search .............. 280/728.3, 280/732
See application file for complete search history.

(56) References Cited

U.S. PATENT DOCUMENTS

| 4,925,209 A | | 5/1990 | Sakurai |
| 5,211,421 A | | 5/1993 | Catron et al. |
| 5,238,264 A | | 8/1993 | Barnes |
| 5,320,381 A | * | 6/1994 | Barnes et al. ............. 280/728.3 |
| 5,362,096 A | | 11/1994 | Satoh et al. |
| 5,382,047 A | * | 1/1995 | Gajewski ................. 280/728.3 |
| 5,429,385 A | | 7/1995 | Kamiji et al. |
| 5,549,324 A | * | 8/1996 | Labrie et al. ............. 280/728.3 |
| 5,560,646 A | | 10/1996 | Gray et al. |
| 5,564,731 A | | 10/1996 | Gallagher et al. |
| 5,816,609 A | | 10/1998 | Gray et al. |
| 5,829,778 A | * | 11/1998 | Woolley et al. ........... 280/728.3 |
| 6,045,153 A | | 4/2000 | Sommer et al. |
| 6,045,154 A | | 4/2000 | Walton et al. |
| 6,053,527 A | | 4/2000 | Gans et al. |
| 6,457,739 B1 | * | 10/2002 | Dailey et al. ............. 280/728.3 |
| 6,644,685 B2 | * | 11/2003 | Sun et al. ................. 280/728.3 |
| 6,719,320 B2 | | 4/2004 | Gray et al. |
| 6,921,105 B2 | | 7/2005 | Speelman et al. |

FOREIGN PATENT DOCUMENTS

EP 0 616 925 A1 9/1994
JP 2000233703 A 8/2000

OTHER PUBLICATIONS

JP 2000233703 A—Japanese Publication dated Aug. 29, 2000—English Abstract.

* cited by examiner

*Primary Examiner*—John Q. Nguyen
*Assistant Examiner*—Robert A. Coker
(74) *Attorney, Agent, or Firm*—Brinks Hofer Gilson & Lione

(57) ABSTRACT

An instrument panel for an automobile passenger compartment includes a substrate having an outer surface and an inner surface and defining an opening extending therethrough. An air bag door assembly is mounted to the outer surface of the substrate, and an air bag device is mounted adjacent the inner surface of the substrate and aligned with the opening formed within the substrate. The air bag door assembly includes a door panel that is mounted adjacent the opening formed within the substrate in a closed position. The door panel is pre-tensioned such that the door panel will substantially return to the closed position after deployment of the air bag through the opening within the substrate.

14 Claims, 8 Drawing Sheets

SELF-CLOSING AIRBAG DOOR ASSEMBLY

BACKGROUND

1. Field of the Invention

This invention is related to a foam-in-place instrument panel having a concealed and integrated passenger side airbag mounted therein. More specifically, the present invention relates to an instrument panel having a self-closing air bag door assembly mounted therein.

2. Background of the Invention

Generally in prior air bag assemblies, when the air bag is deployed, the air bag pushes an air bag door panel outward and breaks through the foam and outer skin of the instrument panel, and expands into the passenger compartment of the vehicle. When this happens, the air bag door panel may remain projecting outward into the interior of the passenger compartment.

Therefore, there is a need for an improved air bag door assembly that provides a door panel that will retract substantially back to it's original position prior to deployment of the air bag.

SUMMARY

In one aspect, an instrument panel for an automobile passenger compartment in accordance with the present invention includes a substrate having an outer surface and an inner surface and defining an opening extending therethrough. An air bag door assembly is mounted to the outer surface of the substrate, and an air bag device is mounted adjacent the inner surface of the substrate and is aligned with the opening formed within the substrate. The air bag door assembly includes a door panel that is mounted adjacent the opening formed within the substrate in a closed position. The door panel is pre-tensioned such that the door panel will substantially return to the closed position after deployment of the air bag through the opening within the substrate.

In another aspect, the door panel includes a panel portion and a mounting flange. The mounting flange of the door panel is attached to the outer surface of the substrate such that the door panel is elastically deformed, whereby the mounting flange is oriented at and angle, between zero and forty degrees, relative to the panel portion, and the panel portion of the door panel is compressed against the outer surface of the substrate.

In still another aspect, the air bag door assembly further includes an adhesive tape attached to and extending around a perimeter of the door panel. The adhesive tape extends onto the substrate such that a seal is formed between the door panel and the substrate. A clamp frame is mounted onto the outer surface of the substrate and extends at least partially around the opening formed within the substrate. The clamp frame at least partially covers the portions of the adhesive tape that extend onto the substrate. The clamp frame is also mounted over the mounting flange of the door panel, such that the mounting flange is positioned between the clamp frame and the outer surface of the substrate.

In yet another aspect, the outer surface of the substrate is contoured such that a clamp angle is defined between portions of the substrate against which the mounting flange of the door panel is held and portions of the substrate against which the panel portion of the door panel is held. The clamp frame secures the mounting flange against the substrate whereby the door panel is forced to elastically deform according to the clamp angle, such that the panel portion of the door panel is held in compression against the outer surface of the substrate.

In still another aspect, a skin covering extends over the substrate. The skin covering includes a pre-weakened pattern outlining an outer periphery of the panel portion of the door panel. The pre-weakened pattern provides a break point to allow a controlled portion of the skin covering immediately over the opening within the substrate to break away upon deployment of the air bag device. A foam is positioned between the skin covering and the substrate to fill the area between the skin and the substrate and to support the skin.

In yet another aspect, the door panel is formed from an elastic material. Preferably, the door panel is formed from a material having an ultimate elongation of at least fifteen percent, and an elastic recovery of at least fifty percent. The door panel could also be formed from woven polypropelene or another suitable material.

In still another aspect, the panel portion and the mounting flange of the door panel are formed from a metallic material. A hinge is positioned between and interconnects the panel portion and the mounting flange of the door panel. The hinge is formed from an elastic material. Preferably, the hinge is formed from a material having an ultimate elongation of at least fifteen percent, and an elastic recovery of at least fifty percent. The door panel could also be formed from woven polypropelene or another suitable material.

In yet another aspect, the door panel includes two halves, each half including a panel portion and a mounting flange, the mounting flanges of the two halves of the door panel being attached to the outer surface of the substrate, on opposite sides of the opening formed within the substrate, such that each half of the door panel is elastically deformed, the mounting flanges are oriented at and angle relative to the panel portions of each half, the panel portions are compressed against the outer surface of the substrate, and distal ends of the panel portions overlap one another over the opening formed in the substrate.

DESCRIPTION OF THE DRAWINGS

The above, as well as other advantages of the present invention, will become readily apparent to those skilled in the art from the following detailed description of a preferred embodiment when considered in the light of the accompanying drawings.

DESCRIPTION OF THE EMBODIMENTS

Figure 1:
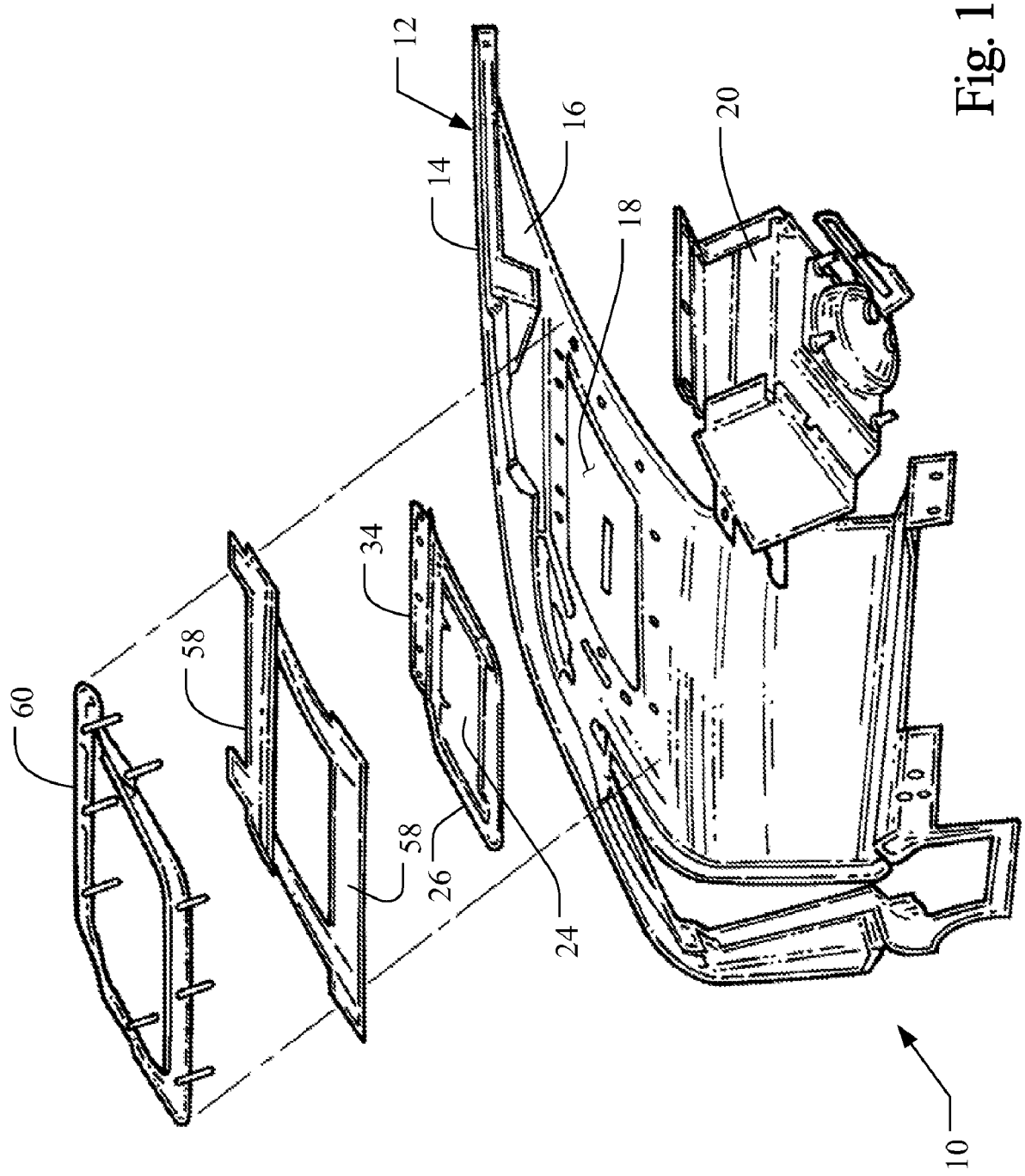
FIG. 1 is an exploded view of an instrument panel in accordance with the present invention.

Referring to FIG. 1, an exploded view of an instrument panel of the present invention is shown generally at 10. The instrument panel 10 includes a substrate 12 that forms the underlying structure for the instrument panel 10. The substrate 12 can be made from any suitable rigid material, however in the preferred embodiment, the substrate 12 is formed from plastic. The substrate 12 has an outer surface 14 that faces the interior of the vehicle and an inner surface 16 that faces away from the interior of the vehicle. The substrate 12 further includes an opening 18 extending therethrough.

Figure 2:
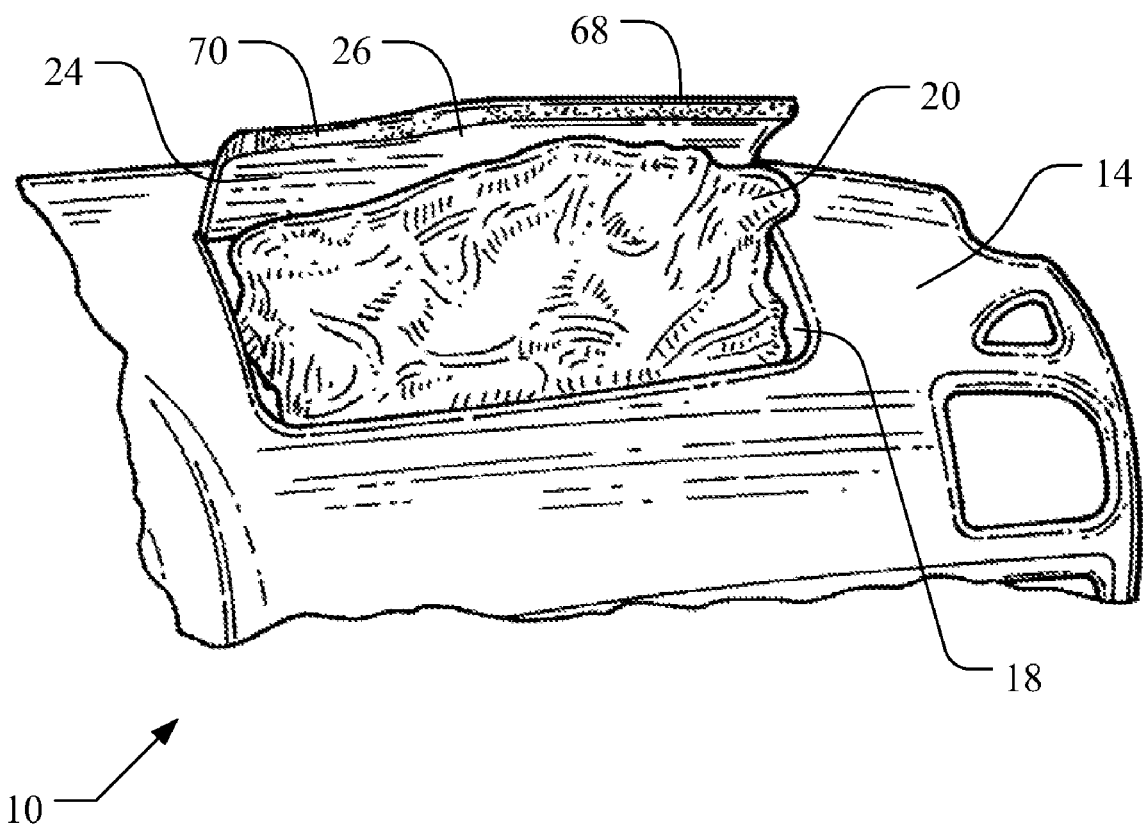
FIG. 2 is a perspective view of the instrument panel shown in FIG. 1, wherein the air bag is breaking through the outer skin of the instrument panel.

An air bag device 20 is mounted behind the substrate 12, adjacent to the inner surface 16 of the substrate 12. The air bag device 20 is aligned with the opening 18 formed within the substrate 12 such that when deployed, the air bag will deploy through the opening 18 formed within the substrate 12, as illustrated in FIG. 2.

An airbag door assembly 22 is mounted to the outer surface 14 of the substrate 12. The air bag door assembly 22 includes a door panel 24 that is mounted adjacent the opening 18 formed within the substrate 12 in a closed position. The door panel 24 is pre-tensioned such that the door panel 24 will substantially return to the closed position after deployment of the air bag 20 through the opening 18 within the substrate 12, as will be discussed in more detail below.

Figure 3:
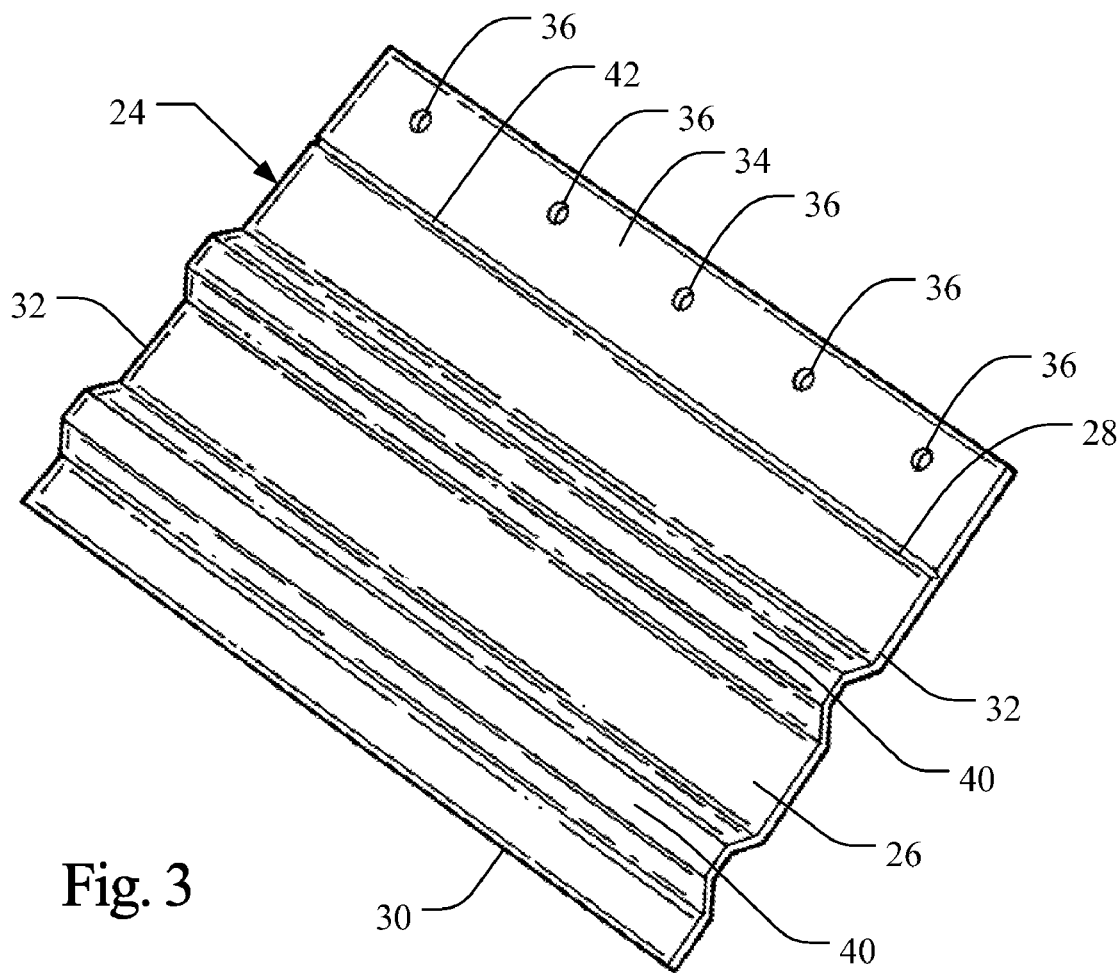
FIG. 3 is a perspective view of a door panel in accordance with the present invention.

Referring to FIG. 3, the door panel 24 includes a panel portion 26 that is generally rectangular with a top edge 28, a bottom edge 30 and two side edges 32. A mounting flange 34 extends from the top edge 28 of the panel portion 26 to allow the door panel 24 to be attached to the outer surface 14 of the substrate 12. The mounting flange 34 preferably includes apertures 36 for securing the door panel 24 to the substrate 12. The door panel 24 is made from an elastic material that will allow the panel portion 26 to bend with respect to the mounting flange 34. This will allow the panel portion 26 to pivot with relation to the mounting flange 34 and the, substrate 12 between a closed position, where the panel portion 26 covers the opening 18 within the substrate 12, and an open position, where the panel portion 26 is deflected outward away from the substrate 12, thereby leaving the opening 18 within the substrate 12 un-covered.

Figure 4:
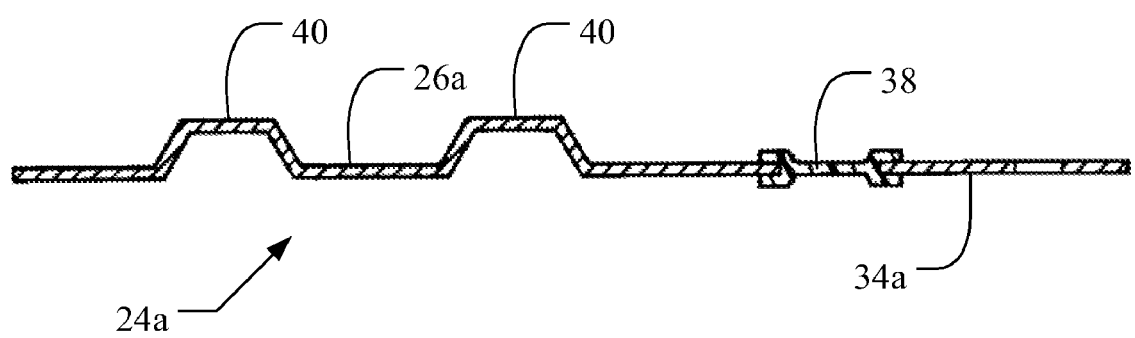
FIG. 4 is a sectional view of a door panel comprising a panel portion, and mounting flange, and a hinge.

Preferably, the panel portion 26 and the mounting flange 3 of the door panel 24 are formed from a single piece of an elastic material, as shown in FIG. 3. Alternatively, a door panel 24a can include a panel portion 26a and mounting flange 34a are separate metallic pieces connected by a hinge 38, as shown in FIG. 4. The hinge 38 is formed from an elastic material that will allow the panel portion 26a and the mounting flange 34a to deflect relative to one another. In either case, the panel portion 26, 26a of the door panel 24, 24a may include ribs 40 formed therein to provide structural strength. The structural ribs 40 will add stiffness to the panel portion 26 such that when the air bag 20 is deployed, the door panel 24 elastically deflects near the mounting flange 34. The single piece door panel 24 may also include a crease line 42 between the panel portion 26 and the mounting flange 34 to provide a pre-determined flex point to allow proper pivotal movement of the panel portion 26 in relation to the mounting flange 34 and substrate 12.

Preferably, the door panel 26, or the hinge 38, is formed from an elastic material having an ultimate elongation of at least five percent, and an elastic recovery of at least twenty-five percent after being elongated to twenty-five percent of the ultimate elongation. In one embodiment, the material has an ultimate elongation of at least fifteen percent, and an elastic recovery of at least fifty percent when elongated to ninety percent of the ultimate elongation. The ultimate elongation being the amount of deformation when the material fails, and the elastic recovery being the amount that the material will return to the original shape when elastically deformed up to ninety percent of the ultimate elongation. One such material that meets these requirements is marketed under the brand name Curv by Propex Fabrics. Another suitable material would be woven polypropelene. It is to be understood that the elastic properties of the material are the controlling factor, and other suitable materials displaying the proper elastic characteristics would also be applicable.

When determining the ultimate elongation and elastic recovery of any particular material, a hysteresis curve of tensile samples must be developed. When developing the hysteresis curve, tensile samples are tested in a tensile tester. For example, six to ten samples of either machined or injection molded material formed in a dogbone style shape for tensile testing. The samples should be either 3.2 millimeters thick (ASTM) or 4.0 millimeters thick (ISO). The samples should be previously untested or controlled aging as desired.

The tensile testing machine should be a Standard Instron, MTS, or similar tensile tester where the loading extension rate is 500 millimeters per minute, or ninety percent of the maximum capability of the tensile testing machine. It is important to maintain uniform strain in the samples with no necking. The unloading extension rate should be as rapid as possible.

The procedure should be substantially as follows. Test one to three of the samples to failure to determine the approximate extension or engineering strain at failure, i.e. ultimate elongation. Calculate an average from the tests.

Load previously untested samples to twenty-five percent of the ultimate elongation calculated above. Unload the samples to nearly zero load and measure the finite extension or engineering strain. Pause one second, and then load the same samples to fifty percent of the ultimate elongation calculated above. Unload the samples to nearly zero load and measure the finite extension or engineering strain.

Repeat these steps, loading the sample to seventy-five percent and then ninety percent of the ultimate elongation and recording the finite extension or engineering strain when unloaded to almost zero load. Finally, load the samples to failure.

To get one to three curves with at least three load and unloading steps, it may take several samples. It may be necessary to adjust the load cycle targets somewhat to achieve a step where the sample is loading to nearly the strain to failure extension or engineering strain on the step prior to loading to failure. Each sample should be handled as one test with several steps. There shouldn't be a need to re-fixture the sample. The manual for the tensile tester or the manufacturer should have information for the specific machine parameter adjustments to achieve this test, i.e. it may be necessary to use a very small finite load to approximate zero at the end of the unload step.

When the Curv material from Propex was tested in this way, the results were as follows. When the sample was loaded to failure, the ultimate elongation was calculated at 16.6%. The sample was then loaded to 25%, 50%, 75%, and 90% of the ultimate elongation. The elastic recovery at each step was 65.2%, 59.1%, 56.5%, and 55.5% respectively.

Figure 5:
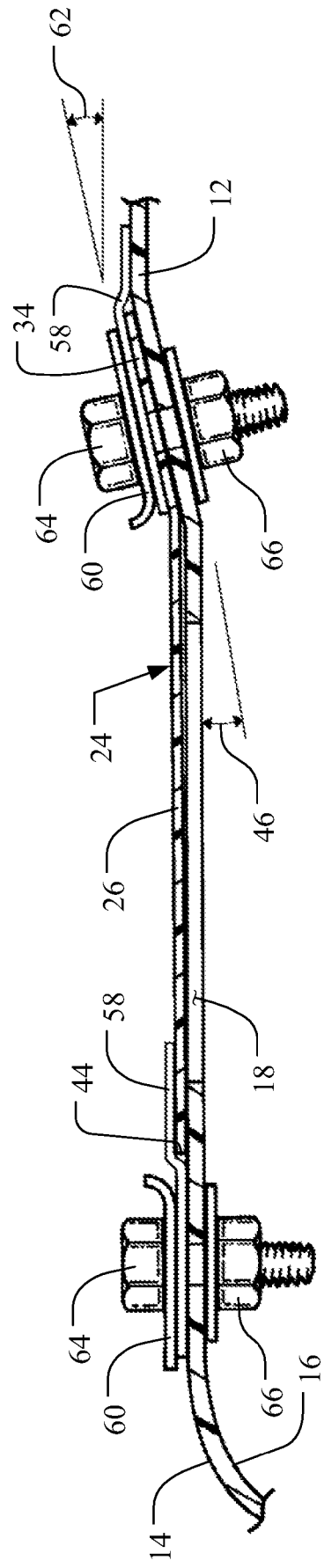
FIG. 5 is a side sectional view of an instrument panel having a single panel door.

Referring to FIG. 5, the size and shape of the door panel 26 is such that an outer periphery 44 of the door panel 24 extends beyond the opening 18 within the substrate 12, whereby the door panel 24 completely covers the opening 18 formed within the substrate 12. The mounting flange 34 is attached to the outer surface 14 of the substrate 12 such that the door panel 24 is elastically deformed. Specifically, the door panel 24 is bent wherein the mounting flange 34 is oriented at an angle 46 relative to the panel portion 26. Due to this bend, the door panel 24 is pre-tensioned toward and is compressed against the outer surface 14 of the substrate 12. Preferably, the door panel 12 is elastically deformed to the extent that the mounting flange 34 is oriented at an angle 46 between zero and forty degrees relative to the panel portion 26.

Figure 6:
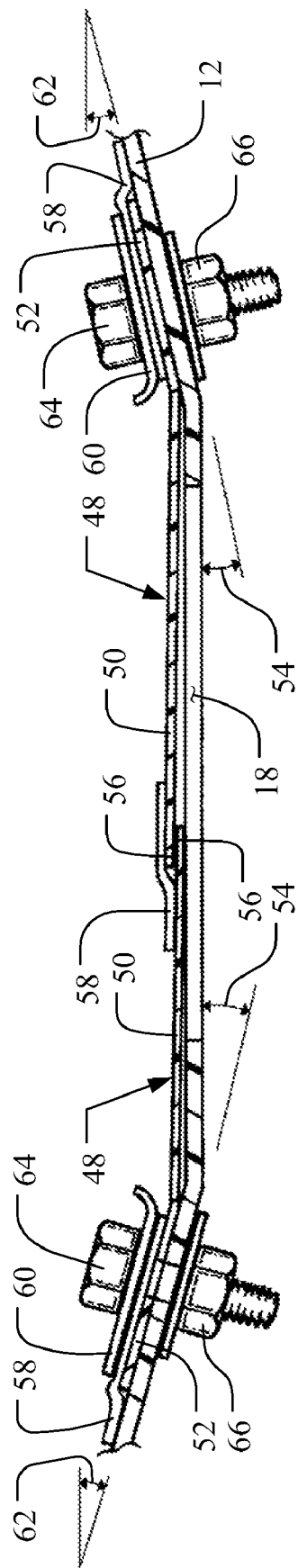
FIG. 6 is a side sectional view of an instrument panel having dual door panels.

Referring to FIG. 6, in an alternative embodiment, two door panel halves 48 each include a panel portion 50 and a mounting flange 52. The mounting flanges 52 of the two halves 48 are attached to the outer surface 14 of the substrate 12, on opposite sides of the opening 18 formed within the substrate 12. Each half 48 is elastically deformed, the mounting flanges 52 are oriented at and angle 54 relative to the panel portions 50 of each half 48, and the panel portions 50 are compressed against the outer surface 14 of the substrate 12. Distal ends 56 of the panel portions 50 overlap one another to completely cover the opening 18 formed in the substrate 12.

A piece of adhesive tape 58 extends around the outer periphery 44 of the door panel 24 or door panel halves 48. The tape 58 extends onto portions of the substrate 12 immediately adjacent the outer periphery 44 of the door panel 24, thereby forming a seal between the edges of the door panel 26 or door panel halves 48 and the outer surface 14 of the substrate 12. In the alternative embodiment shown in FIG. 6, a piece of tape 58 also extends across the distal ends 56 of the panel portions 50 to form a seal between the two door panel halves 48.

A clamp frame 60 is mounted onto the outer surface 14 of the substrate 12. The clamp frame 60 extends at least partially around the opening 18 formed within the substrate 12, and at least partially covers those portions of the adhesive tape 58 that extend onto the substrate 12. The clamp frame 60 is also mounted over the mounting flange 34 of the door panel 24 (FIG. 5) or the mounting flanges 52 of the door panel halves 48 (FIG. 6), such that the mounting flanges 34, 52 are captured between the clamp frame 60 and the outer surface 14 of the substrate 12.

The outer surface 14 of the substrate 12 is contoured such that a clamp angle 62 is defined between portions of the substrate 12 against which the mounting flange 34, 52 is held and portions of the substrate 12 against which the panel portion 26, 50 is held. The clamp frame 60 secures the mounting flange 34, 52 against the substrate 12 whereby the door panel 24 is forced to elastically deform according to the clamp angle 62, such that the panel portion 26, 50 is held in compression against the outer surface 14 of the substrate 12.

Figure 7:
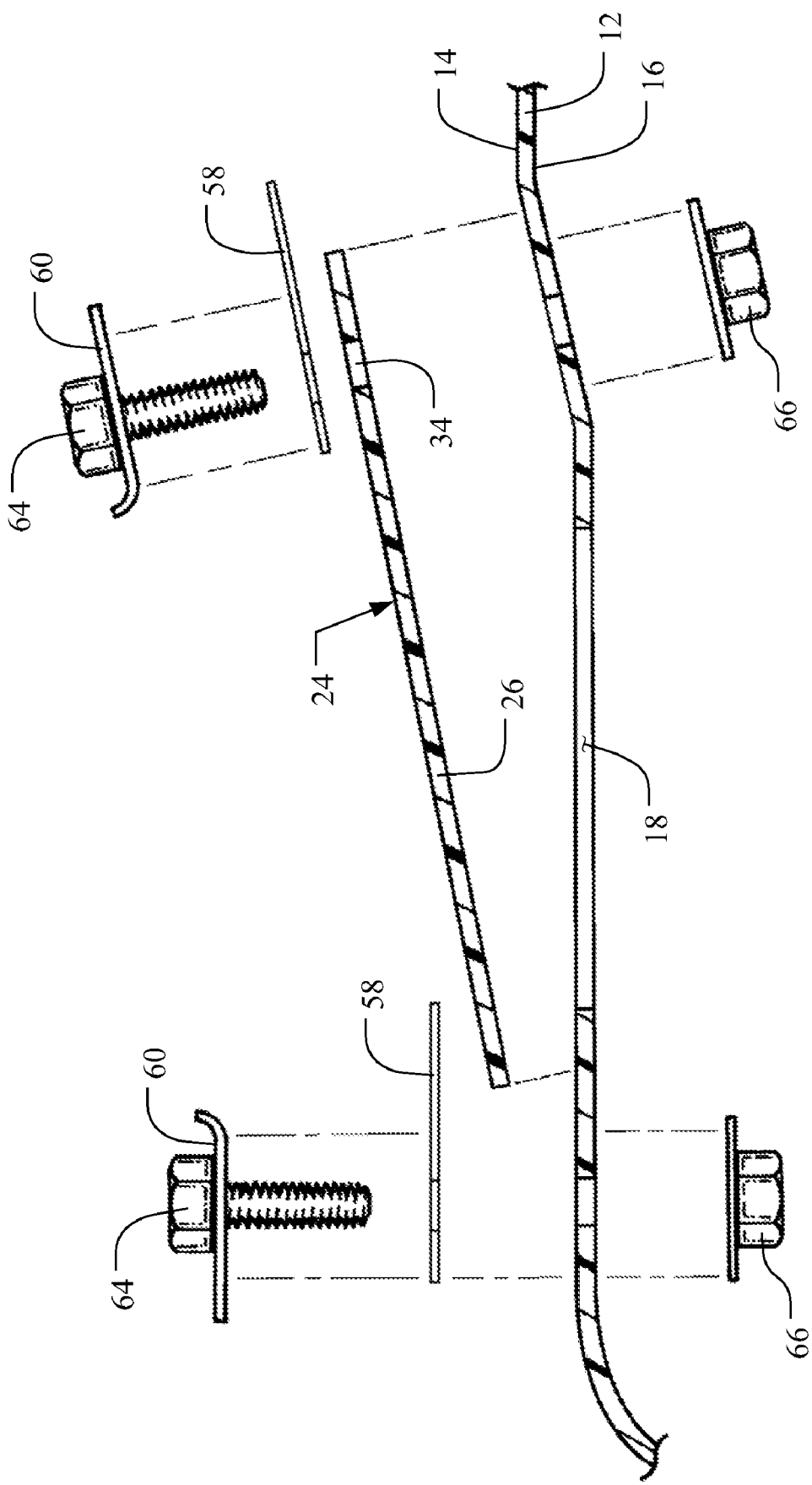
FIG. 7 is an exploded view of the instrument panel shown in FIG. 5.

Referring to FIG. 7, before the clamp frame 60 is mounted, the door panel 24 is substantially flat. Threaded fasteners 64 extend through the clamp frame 60, the mounting flange 34, and the substrate 12 to secure the clamp frame 60 and the mounting flange 34 to the substrate 12. A nut 66 or other appropriate device is threaded onto the threaded fastener 64 to secure the clamp frame 60 and the mounting flange 34 to the outer surface 14 of the substrate 12. As the threaded fasteners 64 are tightened, the clamp frame 60 pushes the mounting flange 34 against the outer surface 14 of the substrate 12, thereby forcing the door panel 24 to bend to conform with the contour of the outer surface 14 of the substrate 12, and the clamp angle 62.

Figure 8:
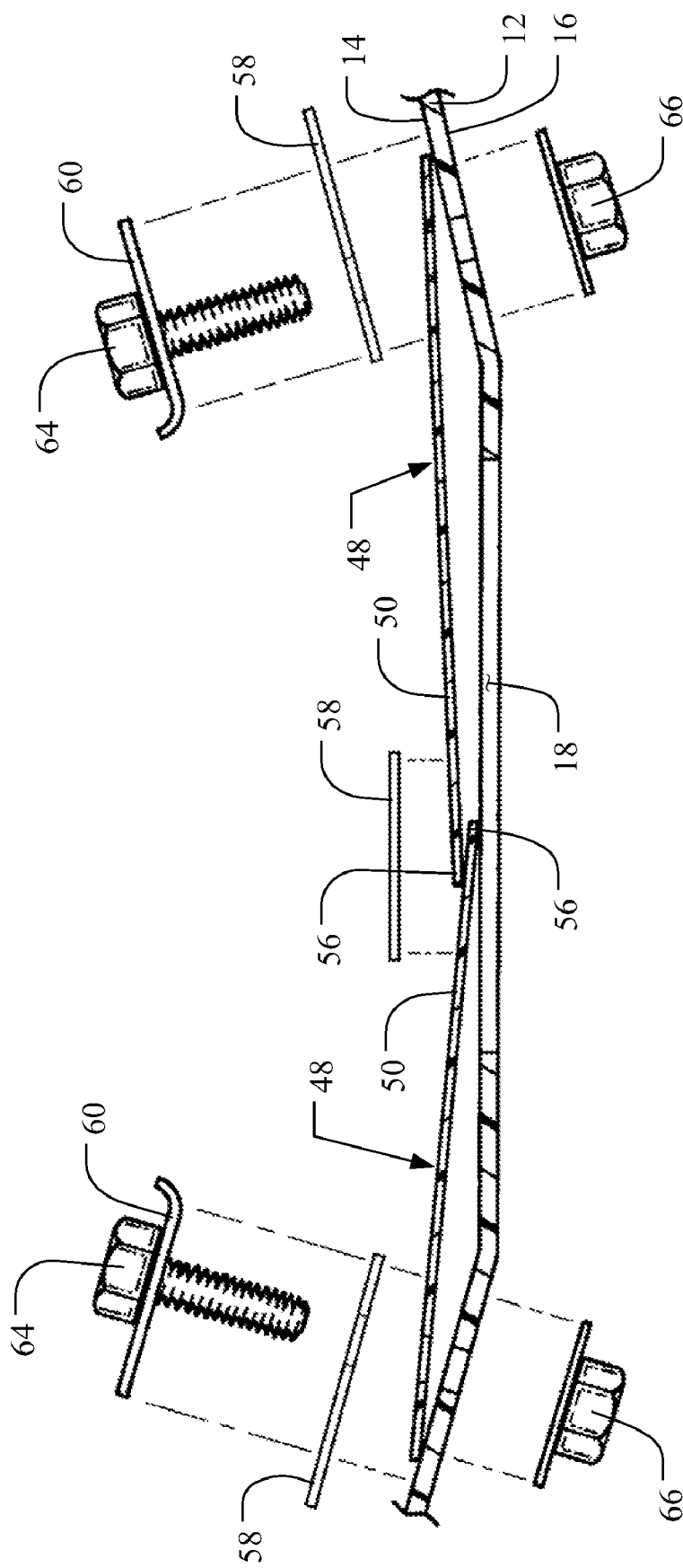
FIG. 8 is an exploded view of the instrument panel shown in FIG. 6.

Likewise, referring to FIG. 8, before the clamp frame 60 is mounted, the door panel halves 48 are substantially flat. Threaded fasteners 64 extend through the clamp frame 60, the mounting flanges 52, and the substrate 12 to secure the clamp frame 60 and the mounting flanges 52 to the substrate 12. A nut 66 or other appropriate device is threaded onto the threaded fastener 64 to secure the clamp frame 60 and the mounting flanges 52 to the outer surface 14 of the substrate 12. As the threaded fasteners 64 are tightened, the clamp frame 60 pushes the mounting flanges 52 against the outer surface 14 of the substrate 12, thereby forcing the door panel halves 48 to bend to conform with the contour of the outer surface 14 of the substrate 12, and the clamp angles 62.

Figure 9:
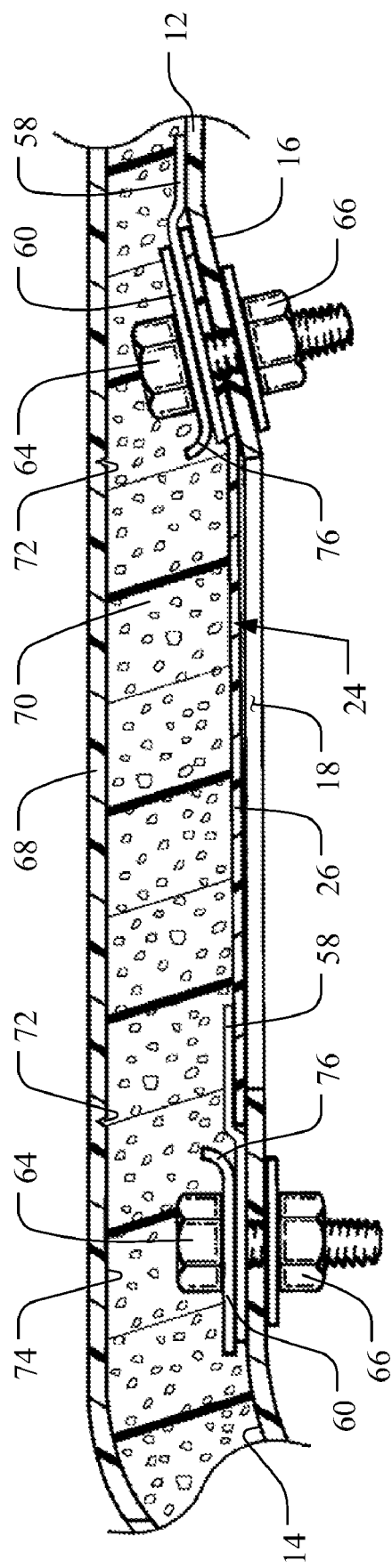
FIG. 9 is a sectional view of the instrument panel with a skin and foam in place on the outer surface of the substrate.

Referring to FIG. 9, an outer skin 68 extends over the entire substrate 12 to conceal the substrate 12 and the air bag door assembly 22 and provide an aesthetically pleasing appearance to the interior of the vehicle. A foam 70 fills in between the outer skin 68 and the substrate 12 to support the outer skin 68 and to provide padding between the outer skin 68 and the substrate 12. The outer skin 68 can be formed from any suitable flexible plastic such as PVC (polyvinyl chloride), thermoplastic urethane, ABS (acrylonitrile-butadiene-styrene), TPO (thermoplastic olefins), ASA (acrylonitrile-styrene-acrylic), or blended elastomeric thermoplastic polymers and polyolefins. The foam 70 can be made from any suitable material such as poly-urethane, PVC, poly-ethylene or polypropylene. The exact material used for the outer skin 68 and the foam 70 will depend on the functional as well as aesthetic requirements of the particular application.

To prevent the outer skin 68 from hindering the effective opening of the door panel 24, the outer skin 68 preferably includes a pre-weakened seam 72 formed on an inner surface 74 of the outer skin 68 opposite the interior of the vehicle. The seam 72 is formed in a generally U-shape to fall immediately over the door panel 24 such that when the air bag 20 is deployed, and the panel portion 26 of the door panel 24 is forced open, the outer skin 68 will tear along the seam 72 to allow the panel portion 26 to pivot outward through the outer skin 68 to the open position. Likewise, the seam 72 would be formed in a generally H-shape for the door panel halves 48 shown in FIG. 6. By forming a pre-weakened seam 72 within the outer skin 68, the tearing of the outer skin 68 is controlled so the outer skin 68 will tear consistently. The pre-weakened seam 72 can be formed in the skin 68 by laser scoring, mechanical scoring, molded in groove or other suitable methods.

An inner edge of the clamp frame 60 includes an outwardly extending flange 76 that is formed around at least a portion of the opening 18 within the substrate 12. The flange 76 acts as a tear initiator for the foam 70 when the air bag device 20 is deployed. The presence of the flange 76 reduces the thickness of the foam 70 at that point, thereby providing a weakened area such that the tearing of the foam 70 is controlled and will tear consistently. Preferably, the flange 76 is substantially aligned with the pre-weakened seam 72 formed within the outer skin 68.

When the instrument panel 10 is formed, the foam 70 between the substrate 12 and the outer skin 68 is typically injected as a liquid which then dries to a solid foam 70. The tape 58 that seals the door panel 24 to the outer surface 14 of the substrate 12 prevents the liquid foam from leaking behind the substrate 12.

The instrument panel 10 is preferably formed by providing the substrate 12 with the opening 18 formed therein. The airbag door assembly 22 is mounted to the outer surface 14 of the substrate 12. The airbag device 20 is mounted either to structural components behind the substrate 12 or to the inner surface 16 of the substrate 12 itself, aligned with the opening 18 formed therein, such that the air bag device 20 will expand outward through the opening 18 in the substrate 12 when deployed.

The outer skin 68 is extended over the substrate 12 and liquid foam 70 is injected between the outer skin 68 and the substrate 12 to substantially fill the space therein and to provide support for the outer skin 68.

In accordance with the provisions of the patent statutes, the present invention has been described in what is considered to represent its preferred embodiment. However, it should be noted that the invention can be practiced otherwise than as specifically illustrated and described.

What is claimed is:

1. An instrument panel for an automobile passenger compartment comprising:
 a substrate having an outer surface and an inner surface and defining an opening extending therethrough;
 an air bag door assembly mounted to the substrate; and
 an air bag device mounted adjacent the inner surface of the substrate and aligned with the opening formed within the substrate;
 the air bag door assembly including a door panel that is mounted adjacent the opening formed within the substrate in a closed position, the door panel being formed from a material having an ultimate elongation of at least five percent, and an elastic recovery of at least twenty-five percent after being elongated to twenty-five percent of the ultimate elongation, such that the door panel will substantially return to the closed position after deployment of the air bag through the opening within the substrate the panel portion and the mounting flange of the door panel are formed from a metallic material, the door panel including a hinge positioned between and interconnecting the panel portion and the mounting flange of the door panel, the hinge being formed from woven polypropelene having an ultimate elongation of at least fifteen percent and an elastic recovery of at least fifty percent.

2. The instrument panel of claim 1, wherein the door panel is elastically deformed such that the mounting flange is oriented at an angle between zero degrees and forty degrees relative to the panel portion 3. The instrument panel of claim 1 wherein the panel portion of the door panel has stiffening ribs formed therein.

4. An instrument panel for an automobile passenger compartment comprising;
 a substrate having an outer surface and an inner surface and defining an opening extending therethrough;
 an air bag door assembly mounted to the substrate; and
 an air bag device mounted adjacent the inner surface of the substrate and aligned with the opening formed within the substrate;
 the air bag door assembly including a door panel that is mounted adjacent the opening formed within the substrate in a closed position, the door panel being formed from a material having an ultimate elongation of at least five percent, and an elastic recovery of at least twenty-five percent after being elongated to twenty-five percent of the ultimate elongation, such that the door panel will substantially return to the closed position after deployment of the air bag through the opening within the substrate, the door panel including a panel portion and a mounting flange, the mounting flange being attached to the outer surface of the substrate such that the door panel is elastically deformed and the mounting flange is oriented at an angle between zero degrees and forty degrees relative to the panel portion, the panel portion of the door panel being compressed against the outer surface of the substrate, wherein the air bag door assembly further includes an adhesive tape attached to and extending around a perimeter of the door panel, the adhesive tape extending onto the substrate such that a seal is formed between the door panel and the substrate.

5. The instrument panel of claim 4 further including a clamp frame mounted onto the outer surface and extending at least partially around the opening formed within the substrate, the clamp frame at least partially covering the portions of the adhesive tape that extend onto the substrate.

6. The instrument panel of claim 5 wherein the clamp frame is mounted over the mounting flange of the door panel, such that the mounting flange is positioned between the clamp frame and the outer surface of the substrate.

7. The instrument panel of claim 6, wherein the outer surface of the substrate is contoured such that a clamp angle is defined between portions of the substrate against which the mounting flange of the door panel is held and portions of the substrate against which the panel portion of the door panel is held, the clamp frame securing the mounting flange against the substrate whereby the door panel is forced to elastically deform according to the clamp angle, such that the panel portion of the door panel is held in compression against the outer surface of the substrate.

8. The instrument panel of claim 7 further including a skin covering extending over the substrate.

9. The instrument panel of claim 8 wherein the skin covering includes a pre-weakened pattern outlining an outer periphery of the panel portion of the door panel, the pre-weakened pattern providing a break point to allow a controlled portion of the skin covering immediately over the opening within the substrate to break away upon deployment of the air bag device, the skin providing no external indicia of the air bag device located beneath.

10. The instrument panel of claim 9 further including foam positioned between the skin covering and the substrate.

11. The instrument panel of claim 10 wherein the clamp frame includes an outwardly extending flange to provide a tear initiator for the foam during deployment of the airbag device.

12. An instrument panel for an automobile passenger compartment comprising:
 a substrate having an outer surface and an inner surface and defining an opening extending therethrough;
 an air bag door assembly mounted to the substrate; and
 an air baa device mounted adjacent the inner surface of the substrate and aligned with the opening formed within the substrate;
 the air bag door assembly including a door panel that is mounted adjacent the opening formed within the substrate in a closed position, the door panel being formed from a material having an ultimate elongation of at least five percent, and an elastic recovery of at least twenty-five percent after being elongated to twenty-five percent of the ultimate elongation, such that the door panel will substantially return to the closed position after deployment of the air bag through the opening within the substrate;
 the door panel including a panel portion and a mounting flange, the mounting flange of the door panel being attached to the outer surface of the substrate such that the door panel is elastically deformed and the mounting flange is oriented at an angle relative to the panel portion, the panel portion of the door panel being compressed against the outer surface of the substrate; and
 wherein the door panel includes two halves, each half including a panel portion and a mounting flange, the mounting flanges of the two halves of the door panel being attached to the outer surface of the substrate, on opposite sides of the opening formed within the substrate, such that each half of the door panel is elastically deformed, the mounting flanges are oriented at an angle relative to the panel portions of each half, the panel portions are compressed against the outer surface of the substrate, and distal ends of the panel portions overlap one another over the opening formed in the substrate.

13. An instrument panel for an automobile passenger compartment comprising;
a substrate having an outer surface and an inner surface and defining an opening extending therethrough;
an air bag door assembly mounted to the substrate; and
an air bag device mounted adjacent the inner surface of the substrate and aligned with the opening formed within the substrate;
the air bag door assembly including a door panel that is mounted adjacent the opening formed within the substrate in a closed position, the door panel including a panel portion and a mounting flange;
a clamp frame mounted onto the outer surface and extending at least partially around the opening formed within the substrate, the clamp frame being mounted over the mounting flange of the door panel, such that the mounting flange is positioned between the clamp frame and the outer surface of the substrate, the outer surface of the substrate being contoured such that a clamp angle is defined between portions of the substrate against which the mounting flange of the door panel is held and portions of the substrate against which the panel portion of the door panel is held, the clamp frame securing the mounting flange against the substrate whereby the door panel is forced to elastically deform according to the clamp angle, such that the panel portion of the door panel is held in compression against the outer surface of the substrate;
the door panel being formed from a material having an ultimate elongation of at least fifteen percent, and an elastic recovery of at least fifty percent after being elongated to ninety percent of the ultimate elongation, such that the door panel will substantially return to the closed position after deployment of the air bag through the opening within the substrate.

14. An instrument panel for an automobile passenger compartment comprising;
a substrate having an outer surface and an inner surface and defining an opening extending therethrough;
an air bag door assembly mounted to the substrate; and
an air bag device mounted adjacent the inner surface of the substrate and aligned with the opening formed within the substrate;
the air bag door assembly including a door panel that is mounted adjacent the opening formed within the substrate in a closed position, the door panel including a panel portion and a mounting flange formed from a metallic material, the door panel including a hinge positioned between and interconnecting the panel portion and the mounting flange of the door panel, the hinge being formed from an elastic material;
a clamp frame mounted onto the outer surface and extending at least partially around the opening formed within the substrate, the clamp frame being mounted over the mounting flange of the door panel, such that the mounting flange is positioned between the clamp frame and the outer surface of the substrate, the outer surface of the substrate being contoured such that a clamp angle is defined between portions of the substrate against which the mounting flange of the door panel is held and portions of the substrate against which the panel portion of the door panel is held, the clamp frame securing the mounting flange against the substrate whereby the hinge is forced to elastically deform according to the clamp angle, such that the panel portion of the door panel is held in compression against the outer surface of the substrate;
the hinge being formed from a material having an ultimate elongation of at least fifteen percent, and an elastic recovery of at least fifty percent after being elongated to ninety percent of the ultimate elongation, such that the panel portion of the door panel will substantially return to the closed position after deployment of the air bag through the opening within the substrate.

* * * * *

UNITED STATES PATENT AND TRADEMARK OFFICE
CERTIFICATE OF CORRECTION

| | |
|---|---|
| PATENT NO. | : 7,543,845 B2 |
| APPLICATION NO. | : 11/326146 |
| DATED | : June 9, 2009 |
| INVENTOR(S) | : Daniel Phillip Dailey et al. |

It is certified that error appears in the above-identified patent and that said Letters Patent is hereby corrected as shown below:

In column 8, claim 12, line 38, before "device mounted adjacent" replace "baa" with --bag--.

Signed and Sealed this

Twenty-seventh Day of October, 2009

David J. Kappos
*Director of the United States Patent and Trademark Office*